(12) United States Patent
Inomata et al.

(10) Patent No.: US 10,593,478 B2
(45) Date of Patent: Mar. 17, 2020

(54) MULTILAYER CERAMIC CAPACITOR

(71) Applicant: TAIYO YUDEN CO., LTD., Chuo-ku, Tokyo (JP)

(72) Inventors: Yasuyuki Inomata, Takasaki (JP); Masaki Mochigi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 93 days.

(21) Appl. No.: 16/007,902

(22) Filed: Jun. 13, 2018

(65) Prior Publication Data

US 2018/0374643 A1    Dec. 27, 2018

(30) Foreign Application Priority Data

Jun. 22, 2017   (JP) .................................. 2017-122316

(51) Int. Cl.
| | |
|---|---|
| *H01G 4/232* | (2006.01) |
| *H01G 4/012* | (2006.01) |
| *H01G 4/248* | (2006.01) |
| *H01G 4/30* | (2006.01) |
| *H01G 4/224* | (2006.01) |
| *H01G 4/12* | (2006.01) |

(52) U.S. Cl.
CPC ........... *H01G 4/2325* (2013.01); *H01G 4/012* (2013.01); *H01G 4/12* (2013.01); *H01G 4/224* (2013.01); *H01G 4/248* (2013.01); *H01G 4/30* (2013.01); *H01G 4/1227* (2013.01); *H01G 4/1236* (2013.01); *H01G 4/1245* (2013.01)

(58) Field of Classification Search
CPC ........ H01G 4/2325; H01G 4/012; H01G 4/12; H01G 4/224; H01G 4/248; H01G 4/30; H01G 4/1227; H01G 4/1236; H01G 4/1245

USPC .............................................. 361/302.4, 301.4
See application file for complete search history.

(56) References Cited

U.S. PATENT DOCUMENTS

| | | | | |
|---|---|---|---|---|
| 2012/0307418 | A1* | 12/2012 | Kim .......................... | H01G 4/30 361/321.2 |
| 2015/0016014 | A1* | 1/2015 | Park ........................ | H01G 2/065 361/301.4 |
| 2016/0133384 | A1* | 5/2016 | Park ......................... | H01G 4/30 361/301.4 |

FOREIGN PATENT DOCUMENTS

| | | |
|---|---|---|
| JP | H09260185 A | 10/1997 |
| JP | 2000306761 A | 11/2000 |
| JP | 2009200092 A | 9/2009 |

* cited by examiner

*Primary Examiner* — Michael P McFadden
(74) *Attorney, Agent, or Firm* — Law Office of Katsuhiro Arai

(57) ABSTRACT

A multilayer ceramic capacitor includes a multilayer structure wherein $[t1^2 \times L1]/N \geq 10$, when a distance between a first edge that is an outermost edge of internal electrodes that is not connected to a first or second external electrode and a second edge that is an innermost edge of the internal electrodes that is not connected to the first or second external electrode is L1, each thickness of dielectric layers is t1, and a stack number of dielectric layers is N, wherein $[t1^2 \times W1]/N \geq 10$, when a distance between a first edge that is positioned at outermost of the internal electrodes and a second edge that is positioned at innermost of the internal electrodes is W1, and wherein R is larger than W1, when a curvature radius of a corner of an edge of the internal electrodes is R.

8 Claims, 17 Drawing Sheets

FIG. 17

| | L (mm) | W (mm) | T (mm) | Wi (mm) | W1 (mm) | SM (mm) | Li (mm) | L1 (mm) | EM (mm) |
|---|---|---|---|---|---|---|---|---|---|
| EXAMPLE 1 | 14 | 19 | 3.3 | 15 | 1.2 | 0.8 | 11 | 1.3 | 0.85 |
| EXAMPLE 2 | 14 | 19 | 4.1 | 15 | 1.2 | 0.8 | 11 | 1.3 | 0.85 |
| EXAMPLE 3 | 14 | 19 | 4.1 | 15 | 1.2 | 0.8 | 11 | 1.3 | 0.85 |
| EXAMPLE 4 | 14 | 19 | 4.1 | 15 | 1.2 | 0.8 | 11 | 1.3 | 0.85 |
| COMPARATIVE EXAMPLE 1 | 14 | 19 | 3.3 | 15 | 0.019 | 2 | 11 | 0.019 | 1.5 |
| COMPARATIVE EXAMPLE 2 | 14 | 19 | 4.1 | 15 | 0.019 | 2 | 11 | 0.019 | 1.5 |
| COMPARATIVE EXAMPLE 3 | 14 | 19 | 4.1 | 15 | 0.019 | 2 | 11 | 0.019 | 1.5 |

| | R (mm) | t1 ($\mu$m) | ta ($\mu$m) | N | $[(t1)^2 \times L1]/N$ | $[(t1)^2 \times W1]/N$ | BDV (V) |
|---|---|---|---|---|---|---|---|
| EXAMPLE 1 | 2.5 | 26.1 | – | 68 | 13.0 | 12.0 | 1483 |
| EXAMPLE 2 | 2.5 | 35.6 | – | 81 | 20.3 | 18.8 | 1497 |
| EXAMPLE 3 | 2.5 | 35.6 | – | 68 | 24.2 | 22.4 | 1550 |
| EXAMPLE 4 | 2.5 | 26.1 | 78.3 | 68 | 13.0 | 12.0 | 1549 |
| COMPARATIVE EXAMPLE 1 | 0.003 | 26.1 | – | 68 | 0.19 | 0.19 | 535 |
| COMPARATIVE EXAMPLE 2 | 0.003 | 35.6 | – | 81 | 0.30 | 0.30 | 549 |
| COMPARATIVE EXAMPLE 3 | 0.003 | 27.3 | – | 68 | 0.21 | 0.21 | 538 |

US 10,593,478 B2

MULTILAYER CERAMIC CAPACITOR

CROSS-REFERENCE TO RELATED APPLICATION

This application is based upon and claims the benefit of priority of the prior Japanese Patent Application No. 2017-122316, filed on Jun. 22, 2017, the entire contents of which are incorporated herein by reference.

FIELD

A certain aspect of the present invention relates to a multilayer ceramic capacitor.

BACKGROUND

There is known a technology in which an overlap area of internal electrodes is enlarged in order to improve a withstand voltage of a multilayer ceramic capacitor (see Japanese Patent Application Publication No. 2000-306761). There is known a technology in which sides of a plurality of internal electrodes do not coincide with each other in a stack direction in order to improve a withstand voltage (see Japanese Patent Application Publication No. 2009-200092). There is known a technology in which an edge portion of an internal electrode is rounded (see Japanese Patent Application Publication No. 9-260185).

SUMMARY OF THE INVENTION

However, the withstand voltage is not sufficiently improved, in the technologies.

The present invention has a purpose of providing a multilayer ceramic capacitor having a high withstand voltage.

According to an aspect of the present invention, there is provided a multilayer ceramic capacitor including: a multilayer structure in which each of a plurality of dielectric layers and each of a plurality of internal electrode layers are alternately stacked, a main component of the plurality of dielectric layers being ceramic, the multilayer structure having a rectangular parallelepiped shape, the plurality of internal electrode layers being alternately exposed to a first edge face and a second edge face of the multilayer structure, the first edge face facing with the second edge face; and a pair of external electrodes that are respectively provided on the first edge face and the second edge face, wherein $t1^2 \times L1/N$ is equal to or more than 10, when a distance between a first edge that is an outermost edge of edges of the plurality of internal electrodes that is not connected to the first external electrode or the second external electrode in a first direction along a facing direction of the pair of external electrodes and a second edge that is an innermost edge of edges of the plurality of internal electrodes that is not connected to the first external electrode or the second external electrode in the first direction is L1 (mm), each thickness of the plurality of dielectric layers is t1 (μm), and a stack number of the plurality of dielectric layers is N, wherein $t1^2 \times W1/N$ is equal to or more than 10, when a distance between a first edge that is positioned at outermost of the plurality of internal electrodes in a second direction intersecting with the first direction in a plane direction of the plurality of internal electrodes and the plurality of dielectric layers and a second edge that is positioned at innermost of the plurality of internal electrodes in the second direction is W1 (mm), and wherein R is larger than W1, when a curvature radius of a corner of an edge of the plurality of internal electrodes that is not connected to the first external electrode or the second external electrode is R (mm).

BRIEF DESCRIPTION OF THE DRAWINGS

FIG. 17 illustrates each size of samples of examples 1 to 4 and comparative examples 1 to 3.

DETAILED DESCRIPTION

A description will be given of an embodiment with reference to the accompanying drawings.

First Embodiment

Figure 1:
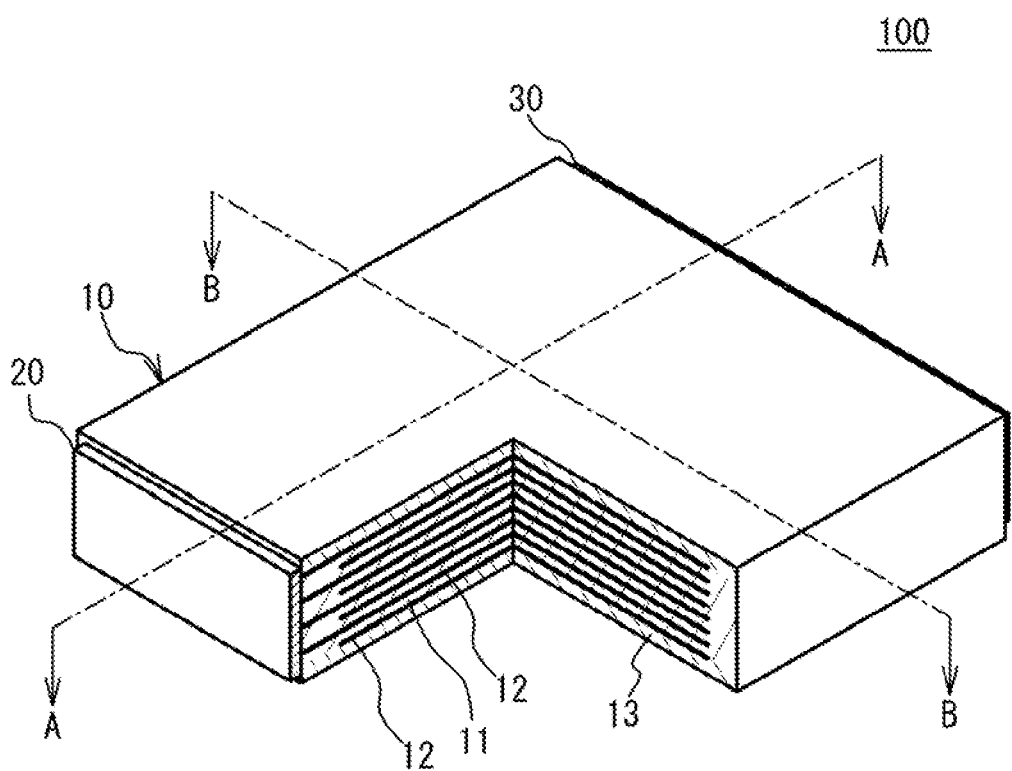
FIG. 1 illustrates a partial perspective view of a multilayer ceramic capacitor in accordance with a first embodiment.
Figure 2:
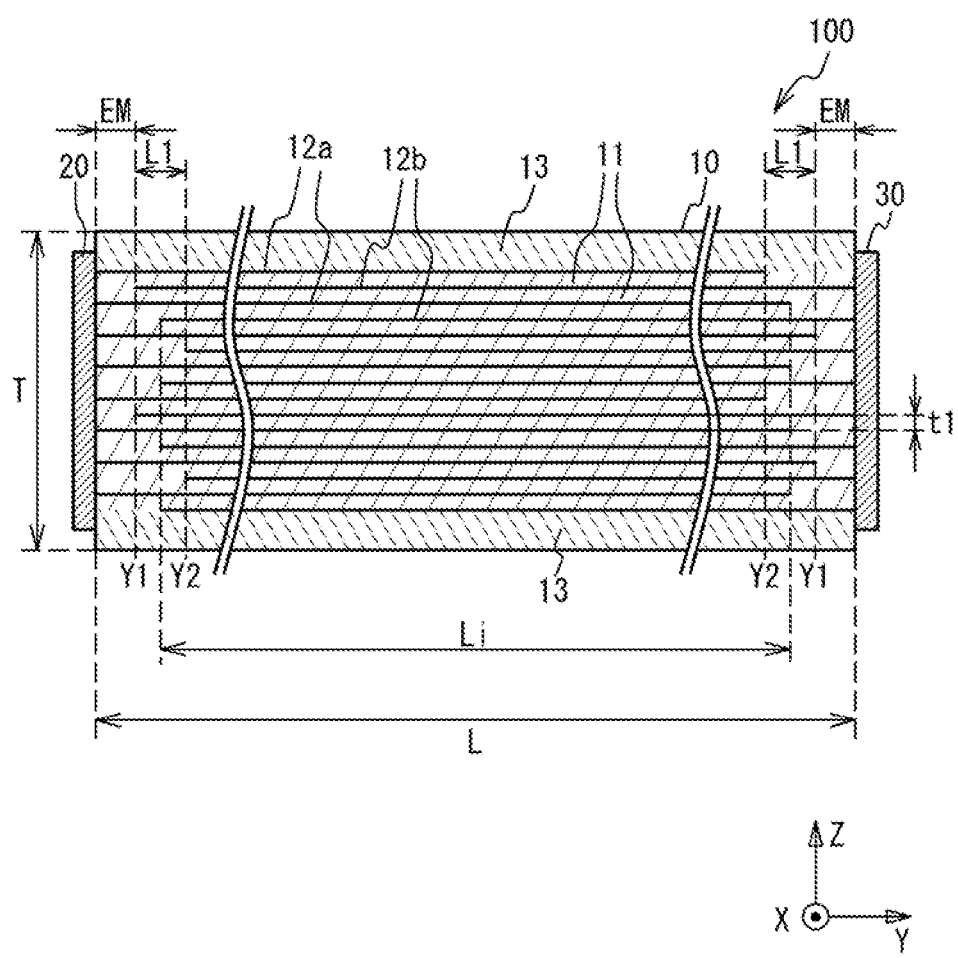
FIG. 2 illustrates a cross sectional view taken along a line A-A of FIG. 1.
Figure 3:
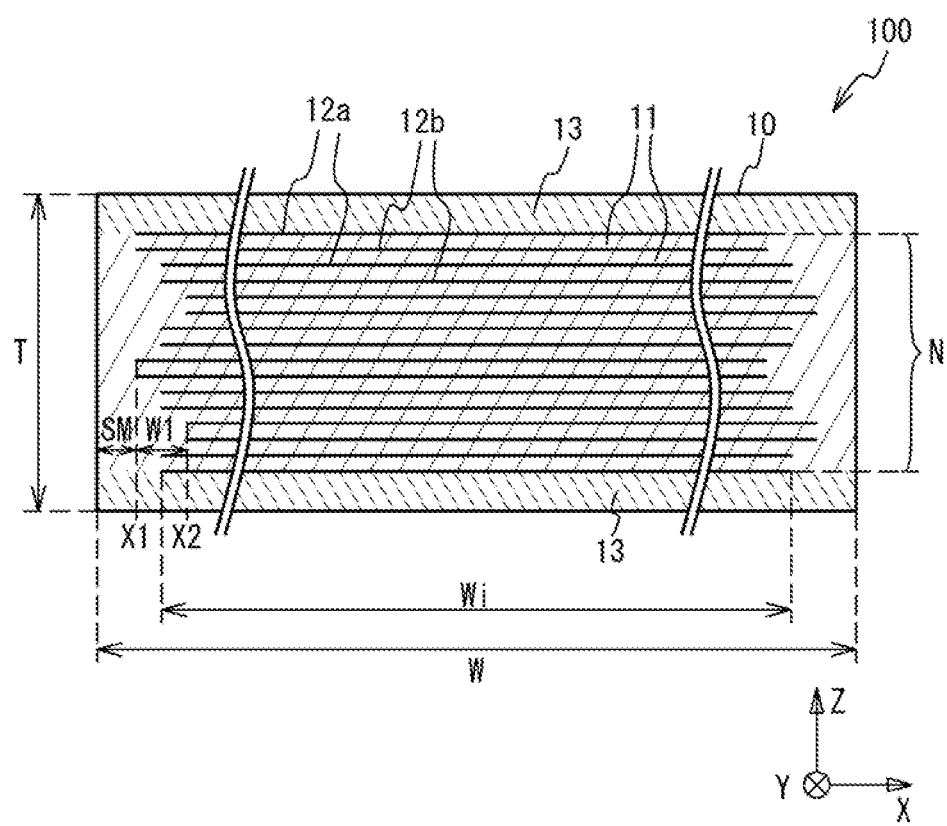
FIG. 3 illustrates a cross sectional view taken along a line B-B of FIG. 1.

A description will be given of a multilayer ceramic capacitor. FIG. 1 illustrates a partial perspective view of a multilayer ceramic capacitor in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, a multilayer ceramic capacitor 100 includes a multilayer structure 10 having a rectangular parallelepiped shape, and a pair of external electrodes 20 and 30 that are provided at edge faces of the multilayer structure 10 facing each other. The multilayer structure 10 has a structure designed to have dielectric layers 11 and internal electrodes 12 alternately stacked. The dielectric layer 11 includes ceramic material acting as a dielectric body. The stack direction of the dielectric layer 11 and the internal electrode 12 is a Z-direction. The facing direction of the external electrodes 20 and 30 is a Y-direction. A direction vertical to the Y-direction and the Z-direction is an X-direction.

End edges of the internal electrodes 12 are alternately exposed to an end face of the multilayer structure 10 on which the external electrode 20 is provided and an end face of the multilayer structure 10 on which the external electrode 30 is provided. Thus, the internal electrodes 12 are alternately conducted to the external electrode 20 and the external electrode 30. In FIG. 2 and FIG. 2, an internal electrode 12a is electrically connected to the external electrode 20. An internal electrode 12b is electrically connected to the external electrode 30. Thus, the multilayer ceramic capacitor 100 has a structure in which a plurality of ceramic capacitors are stacked. And, both edge faces of the multilayer structure 10 in the stack direction of the dielectric layer 11 and the internal electrode 12 are covered by cover layers 13. For example, a main component of the cover layer 13 is the same as that of the dielectric layer 11. As illustrated in FIG. 2, positions of the end edges of the internal electrodes 12a and 12b are different from each other in the Y-direction. As illustrated in FIG. 3, the edge of the internal electrode 12a is different from the edge of the internal electrode 12b in the X-direction. Details are described later.

A main component of the external electrodes 20 and 30 and the internal electrode 12 is a metal such as nickel (Ni), copper (Cu), tin (Sn), silver (Ag), palladium (Pd), gold (Au), or platinum (Pt). The dielectric layer 11 is mainly composed of a ceramic material having a perovskite structure expressed by a general expression $ABO_3$. The ceramic material of the perovskite structure of the dielectric layer 11 may be $BaTiO_3$ (barium titanate), $SrTiO_3$ (strontium titanate), $CaTiO_3$ (calcium titanate), $MgTiO_3$ (magnesium titanate), $CaZrO_3$ (calcium zirconate), $CaTi_xZr_{1-x}O_3$ (calcium titanate zirconate), $BaZrO_3$ (barium zirconate), or $PbTi_xZr_{1-x}O_3$ (lead titanate zirconate: PZT). The ceramic material of the dielectric layer 11 may be $TiO_2$ (titanium oxide). The dielectric layer 11 may be made of sintered material. The dielectric layer 11 is isotropic with respect to a crystal orientation at a macro level. The ceramic material of the perovskite structure may have an off-stoichiometric composition. First, specified additive compounds may be added to the ceramic material. The additive compound may be at least one of oxidation materials of Mg (magnesium), Mn (manganese), V (vanadium), Cr (chromium), and oxidation materials of rare-earth elements (Y (yttrium), Dy (dysprosium), Tm (thulium), Ho (holmium), Tb (terbium), Yb (ytterbium), Er (erbium), Sm (samarium), Eu (europium), Gd (gadolinium)), Co (cobalt), Li (lithium), B (boron), Na (sodium), K (potassium), and Si (silicon), or glass. Each of the dielectric layers 11 has substantially the same thickness. However, there is a dispersion in the thicknesses. For example, the dielectric layers 11 may have a dispersion within plus-minus 10% of an average thickness of the dielectric layers 11. When there is the dispersion in the thicknesses of the dielectric layers 11, each thickness of the dielectric layers 11 means the average thickness of the dielectric layers 11.

As illustrated in FIG. 2 and FIG. 3, a thickness of the multilayer structure 10 in the Z-direction is "T". A length of the multilayer structure 10 in the Y-direction is "L". A width of the multilayer structure 10 in the X-direction is "W". Each thickness of the dielectric layer 11 is "t1". An overlapping width of the internal electrode 12a and the internal electrode 12b in the Y-direction is "Li". In the Y-direction, an outermost edge of the internal electrodes 12a on the external electrode 30 side is a position "Y1". In the Y-direction, an innermost edge of the internal electrodes 12a is a position "Y2". A distance between the position "Y1" and the position "Y2" is a deviation amount "L1". A distance from the edge of the outermost internal electrode 12 to the edge face of the multilayer structure 10 is an end margin "EM". The stack number of the dielectric layer 11 is "N". In the Y-direction, an outermost edge of the internal electrodes 12b on the external electrode 20 side is a position "Y1". In the Y-direction, an innermost edge of the internal electrodes 12b is a position "Y2". A distance between the position "Y1" and the position "Y2" is a deviation amount "L1". In the embodiment, the deviation amount L1 of the internal electrodes 12a is the deviation amount L1 of the internal electrodes 12b. However, the deviation amount L1 of the internal electrodes 12a may be different from the deviation amount L1 of the internal electrodes 12b. A distance from the edge of the outermost internal electrode 12 to the nearer edge face of the multilayer structure 10 is an end margin "EM". A width of the internal electrode 12 in the X-direction is "Wi". A distance between a position X1 and a position X2 is a deviation amount W1. On the same end face side of the multilayer structure 10, the position X1 is an outermost edge of edges of the internal electrodes 12 in the X-direction. On the same end face side of the multilayer structure 10, the position X2 is an innermost edge of the edges of the internal electrodes 12 in the X-direction. A distance from the edge of the outermost internal electrode 12 to the edge nearer face of the multilayer structure 10 is a side margin "SM". The stack number of the dielectric layer 11 is "N".

The present inventors thought the following electrostrictive effect as a reason that a withstand voltage of a multilayer ceramic capacitor is reduced. When a voltage is applied between the internal electrode 12a and the internal electrode 12b, a stress occurs in the multilayer structure 10 because of the electrostrictive effect. A crack occurs in a region in which stress is condensed. The multilayer ceramic capacitor is broken because of the crack or the like.

Figure 4A:
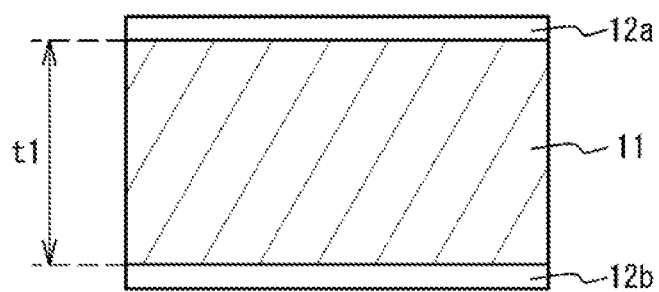
FIG. 4A and FIG. 4B illustrate one ceramic capacitor.
Figure 4B:
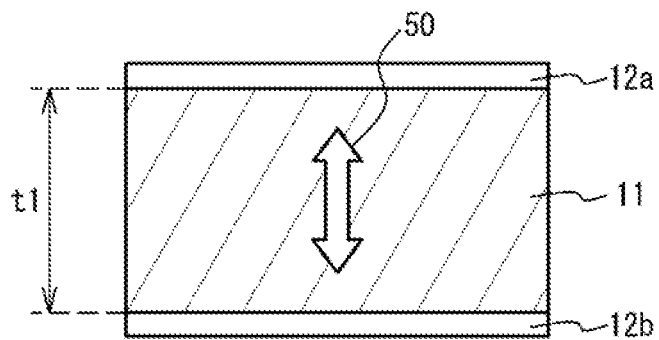

FIG. 4A and FIG. 4B illustrate one ceramic capacitor. As illustrated in FIG. 4A, the internal electrode 12a is provided over the dielectric layer 11 having a thickness "t1", and the internal electrode 12b is provided under the dielectric layer 11. As illustrated in FIG. 4B, a positive voltage is applied to the internal electrode 12a with respect to the internal electrode 12b. In this case, an electrical field is applied to the dielectric layer 11 in the stack direction. Therefore, a displacement extending in the stack direction occurs in the dielectric layer 11 because of the electrostrictive effect as indicated by an arrow 50.

Figure 5:
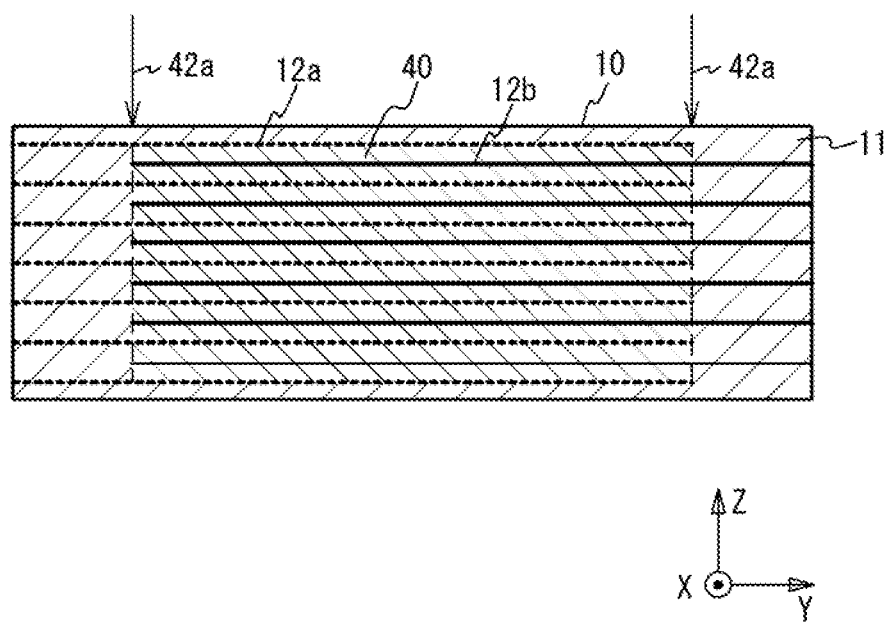
FIG. 5 illustrates a cross sectional view of a multilayer ceramic capacitor in accordance with a first comparative embodiment.

FIG. 5 illustrates a cross sectional view of a multilayer ceramic capacitor in accordance with a first comparative embodiment. As illustrated in FIG. 5, the internal electrode 12a connected to the external electrode 20 is illustrated by a dotted line. The internal electrode 12b connected to the external electrode 30 is illustrated by a solid line. Edges of the internal electrodes 12a in the Y-direction approximately coincide with each other. Edges of the internal electrodes 12b in the Y-direction approximately coincide with each other. A region of the dielectric layer 11 in which displacement occurs because of the electrostrictive effect is a region 40 sandwiched by the internal electrodes 12 in the Z-direction. A hatch direction of the region 40 is inverted with respect to another region of the dielectric layer 11, in order to distinguish the region 40 from another region of the dielectric layer 11. In the multilayer structure 10, tension tends to be condensed to a region in which the displacement rapidly changes. Therefore, the tension tends to be condensed to the edge of the internal electrode 12 as indicated by an arrow 42a.

Figure 6:
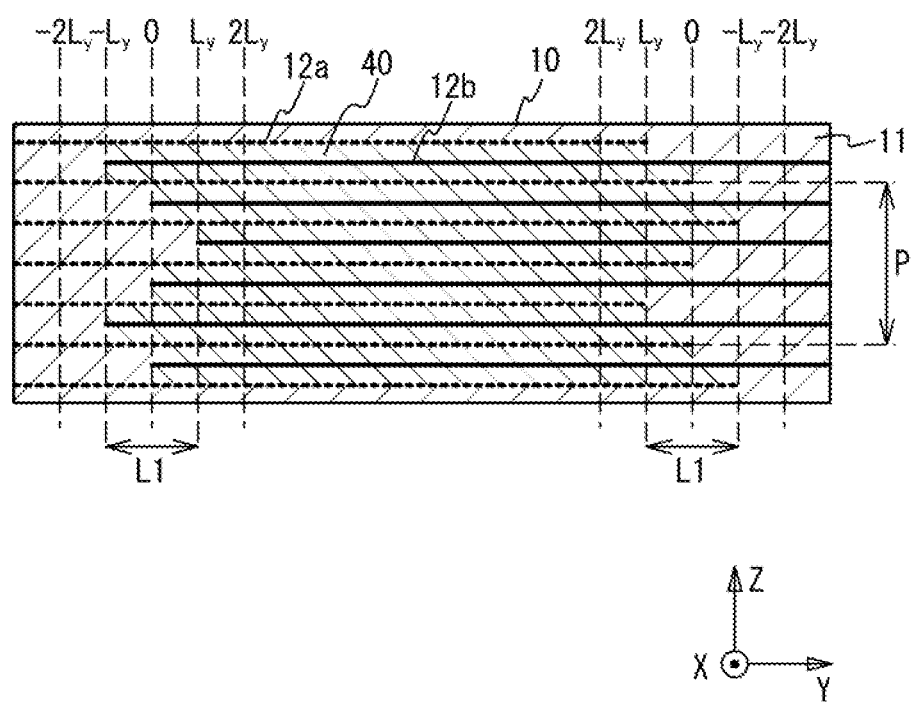
FIG. 6 illustrates a cross sectional view of a multilayer ceramic capacitor in accordance with a first embodiment.

An overall displacement amount "ΔDt" of the stacked dielectric layers 11 caused by the electrostrictive effect is a displacement amount "ΔD" of one dielectric layer 11 multiplied by the stack number "N" of the dielectric layer 11. That is, ΔDt=ΔD×N. The displacement amount "ΔD" in one dielectric layer 11 is proportional to a square of electrical field intensity in the dielectric layer 11. The electric field intensity is inversely proportional to the thickness "t1" of the dielectric layer 11. That is, $\Delta D \propto 1/(t1)^2$. Therefore, $\Delta Dt \propto (t1)^2$ FIG. 6 illustrates a cross sectional view of a multilayer ceramic capacitor 100 in accordance with the embodiment. As illustrated in FIG. 6, edges of the internal electrodes 12a in the Y-direction are different from each other. And edges of the internal electrodes 12b in the Y-direction are different from each other. In this example, the position of the edges of the internal electrodes 12a in the Y-direction is changed in three steps that are 0, +$L_y$, 0 and −$L_y$. The position of the edges of the internal electrodes 12b in the Y-direction is changed in three steps that are 0, +$L_y$ (−$L_y$), 0 and +$L_y$ (−$L_y$). One period "P" includes eight dielectric layers 11. In this case, the deviation amount "L1" is 2$L_y$.

In one period "P", the number of the dielectric layers 11 included in the positions −2$L_y$, −$L_y$, 0, $L_y$ and 2$L_y$ is zero, one, six, eight and eight. Therefore, the overall displacement amount "ΔDt" in each position is as the follows.
the position −2$L_y$: 0
the position −$L_y$: (2/8)×N×ΔD
the position 0: (6/8)×N×ΔD
the position $L_y$: (8/8)×N×ΔD
the position 2$L_y$: (8/8)×N×ΔD The stress corresponds to an inclination of the displacement amount with respect to the position. Therefore, the stress between each position is as follows.
the position −2.5$L_y$: 0
the position −1.5$L_y$: (2/8)×N×ΔD/$L_y$
the position −0.5$L_y$: (4/8)×N×ΔD/$L_y$
the position 0.5$L_y$: (2/8)×N×ΔD/$L_y$
the position 1.5$L_y$: 0

In this example, the position at which the stress becomes the maximum is −0.5 $L_y$. And, the maximum value of the stress is proportional to "N" and "ΔD" and is inversely proportional to "$L_y$" (that is, L1). "ΔD" is inversely proportional to $(t1)^2$. Therefore, the maximum value of the stress is proportional to "N" and is inversely proportional to "$L_y$" (that is, L1) and $(t1)^2$. That is, the maximum value of the stress is proportional to $N/[(t1)^2 \times L1]$. The withstand voltage BDV of the multilayer ceramic capacitor is as follows when the withstand voltage BDV is inversely proportional to the maximum value of the tension.

$$BDV \propto [(t1)^2 \times L1]/N \quad (1)$$

Actually, even if the BDV is not strictly proportional to $[(t1)^2 \times L1]/N$, the BDV becomes larger when $[(t1)^2 \times L1]$ becomes larger. In order to downsize the multilayer ceramic capacitor 100 and enlarge capacity of the multilayer ceramic capacitor 100, it is necessary to reduce "t1" and enlarge "N". Therefore, the withstand voltage becomes smaller. And so, in the embodiment, the deviation amount "L1" is enlarged. Thus, the withstand voltage BDV can be improved.

On the basis of the above-description, with respect to the dielectric layer 11 having the electrostrictive effect, the formula (1) or a correlation corresponding to the formula (1) is satisfied. And, the formula (1) is generally satisfied regardless of a pattern in which the internal electrode 12 is shifted in the Y-direction.

Figure 7:
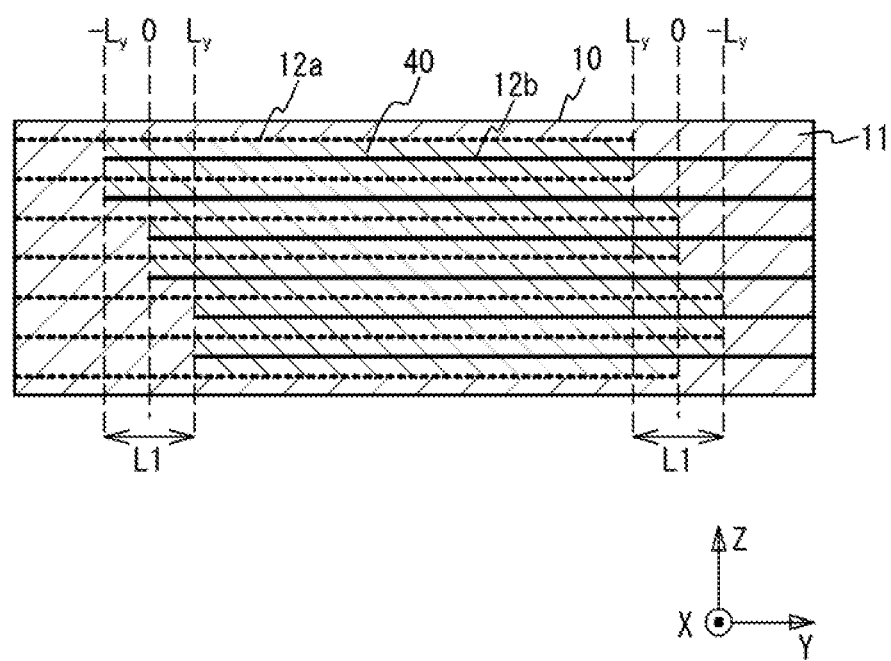
FIG. 7 illustrates a cross sectional view of a multilayer ceramic capacitor in accordance with a first embodiment.

FIG. 7 illustrates a cross sectional view of the multilayer ceramic capacitor 100 in accordance with an embodiment. As illustrated in FIG. 7, two of the internal electrodes 12a adjacent to each other and two of the internal electrodes 12b adjacent to each other are treated as one group. The position of the edges of the internal electrode 12a and the internal electrode 12b in the Y-direction is changed to 0, $L_y$ (−$L_y$), 0 and −$L_y$ (+$L_y$) in this order. In the example, in one period, sixteen dielectric layers 11 are included. The number of the dielectric layers 11 included in the group of which position of the edge is changed is arbitrary.

The number of the internal electrode 12a in the group of the position 0 may be one, and the number of the internal electrode 12b in the group of the position 0 may be one. The number of the internal electrodes 12a in the group of the positions $L_y$ and the group of the position −$L_y$ may be two, and the number of the internal electrodes 12b in the group of the position $L_y$ and the group of the position −$L_y$ may be two. In this manner, the number of the internal electrodes 12 in one group may be changed.

Moreover, the position of the edges of the internal electrodes 12a and 12b in the Y-direction may be changed in steps other than three steps such as 0, $L_y$, 2$L_y$, $L_y$, 0, −$L_y$, −2$L_y$ and −$L_y$.

Figure 8:
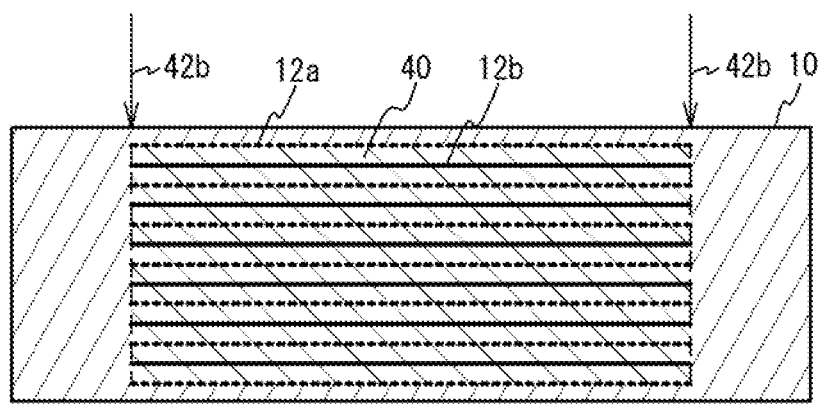
FIG. 8 illustrates a cross sectional view of a multilayer ceramic capacitor in accordance with a second comparative embodiment.
Figure 8:
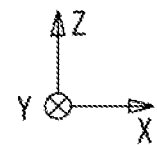

FIG. 8 illustrates a cross sectional view of a multilayer ceramic capacitor in accordance with a second comparative embodiment. As illustrated in FIG. 8, the internal electrode 12a connected to the external electrode 20 is illustrated by a dotted line. The internal electrode 12b connected to the external electrode 30 is illustrated by a solid line. Edges of the internal electrodes 12 in the X-direction approximately coincide with each other. A region of the dielectric layer 11 in which displacement occurs because of the electrostrictive effect is the region 40 sandwiched by the internal electrodes 12 in the Z-direction. A hatch direction of the region 40 is inverted with respect to another region of the dielectric layer 11, in order to distinguish the region 40 from another region of the dielectric layer 11. In the multilayer structure 10, stress tends to be condensed to a region in which the displacement rapidly changes. Therefore, the stress tends to be condensed to the edge of the internal electrode 12 as indicated by an arrow 42.

Figure 9:
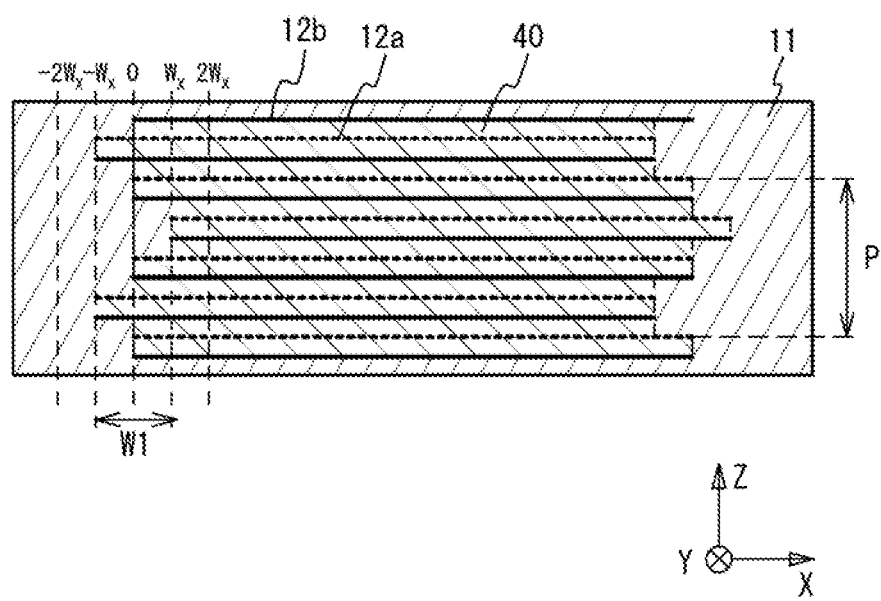
FIG. 9 illustrates a cross sectional view of the multilayer ceramic capacitor in accordance with a first embodiment.

FIG. 9 illustrates a cross sectional view of the multilayer ceramic capacitor 100 in accordance with the embodiment. As illustrated in FIG. 9, edges of the internal electrodes 12 in the X-direction are different from each other. In this example, one internal electrode 12a and one internal electrode 12b adjacent to each other are treated as one group. The position of the edges of the groups in the X-direction is changed in three steps that are +$W_x$, 0 and −$W_x$. One period "P" includes eight dielectric layers 11. In this case, the deviation amount "W1" is 2L.

In one period "P", the number of the dielectric layers 11 included in the positions −2Wx, −Wx, 0, Wx and 2Wx is zero, one, five, eight and eight. Therefore, the overall displacement amount "ΔDt" in each position is as the follows.
the position −2Wx: 0
the position −Wx: (1/8)×N×ΔD
the position 0: (5/8)×N×ΔD
the position Wx: (8/8)×N×ΔD
the position 2Wx: (8/8)×N×ΔD The stress corresponds to an inclination of the displacement amount with respect to the position. Therefore, the stress between each position is as follows.
the position −2.5$W_x$: 0
the position −1.5$W_x$: (1/8)×N×ΔD/$W_x$ the position $-0.5W_x$: $(1/2) \times N \times \Delta D/W_x$
the position $0.5W_x$: $(3/8) \times N \times \Delta D/W_x$
the position $1.5W_x$: 0

W0 is a fixed value. "$W_x$" is changed in five steps. And, each stress is calculated. The five steps include $W_x=0.5 \times W0$, $0.75 \times W0$, $1.0 \times W0$, $1.5 \times W0$, and $2.0 \times W0$. And, the stress is normalized so that the maximum stress at $W_x=0.5 \times W0$ is 1.

Figure 10:
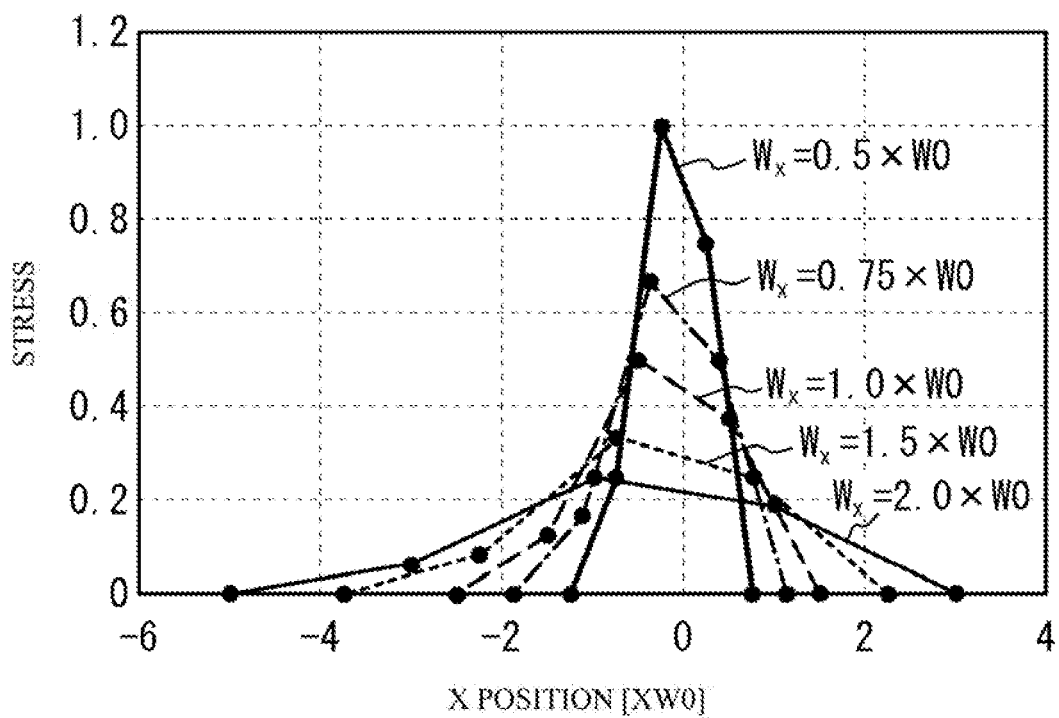
FIG. 10 illustrates stress with respect to a calculated X position.

FIG. 10 illustrates stress with respect to the calculated X position. As illustrated in FIG. 10, when "$W_x$" is enlarged, a maximum value of the stress is reduced. The value of the stress becomes the maximum when the position in the X-direction is $-0.5W_x$. The maximum value is inversely proportional to "$W_x$".

In this manner, the maximum value of the stress is proportional to "N" and "$\Delta D$" and is inversely proportional to "$W_x$" (that is, W1). "$\Delta D$" is inversely proportional to $(t1)^2$. Therefore, the maximum value of the stress is proportional to "N" and is inversely proportional to "$W_x$" (that is, W1) and "t1". That is, the maximum value of the stress is proportional to $N/[(t1)^2 \times W1]$. The withstand voltage BDV of the multilayer ceramic capacitor is as follows when the withstand voltage BDV is inversely proportional to the maximum value of the stress.

$$BDV \propto [(t1)^2 \times W1]]/N \qquad (2)$$

Actually, even if the BDV is not strictly proportional to $[(t1)^2 \times W1]]/N$, the BDV becomes larger when $[(t1)^2 \times W1]]$ becomes larger. In order to downsize the multilayer ceramic capacitor and enlarge capacity of the multilayer ceramic capacitor, it is necessary to reduce "t1" and enlarge "N". Therefore, the withstand voltage BDV becomes smaller. And so, in the embodiment, the deviation amount "W1" is enlarged. Thus, the withstand voltage BDV can be improved.

On the basis of the above-description, with respect to the dielectric layer 11 having the electrostrictive effect, the formula (2) or a correlation corresponding to the formula (2) is satisfied. And, the formula (2) is generally satisfied regardless of a pattern in which the internal electrode 12 is shifted in the X-direction.

Figure 11:
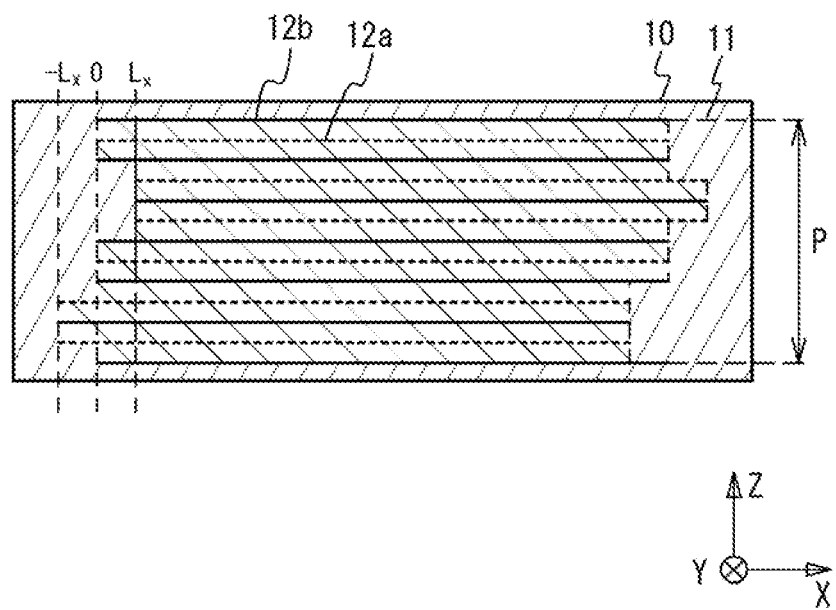
FIG. 11 illustrates a cross sectional view of a multilayer ceramic capacitor in accordance with a first embodiment.

FIG. 11 illustrates a cross sectional view of the multilayer ceramic capacitor in accordance with another embodiment. As illustrated in FIG. 11, three internal electrodes 12 adjacent to each other are treated as one group. The position of the edges of groups is changed to 0, $W_x$, 0 and $-W_x$ in this order. In the example, in one period "P", twelve dielectric layers 11 are included. The number of the dielectric layers 11 included in the group of which position of the edge is changed is arbitrary.

The number of the internal electrodes 12 in the group of the position 0 may be two, and the number of the internal electrodes 12 in the group of the position $W_x$ and the group of the position $-W_x$ may be three. In this manner, the number of the internal electrodes 12 in one group may be changed.

Moreover, the position of the edges of the internal electrodes 12 in the X-direction may be changed in steps other than three steps such as 0, $W_x$, $2W_x$, $W_x$, 0, $-W_x$, $-2W_x$ and $-W_x$.

Figure 12:
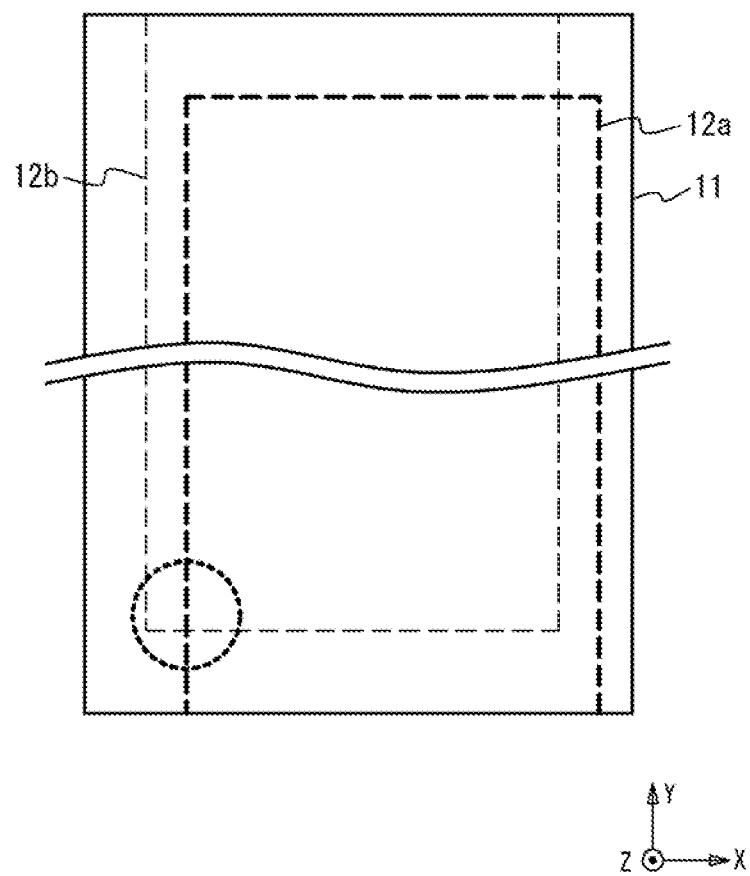
FIG. 12 illustrates overlapping of internal electrodes in a case where a multilayer ceramic capacitor of a third embodiment is seen along a Z-direction.

FIG. 12 illustrates overlapping of the internal electrodes 12a and 12b in a case where the multilayer ceramic capacitor of the third embodiment is seen along the Z-direction. In FIG. 12, the dielectric layer 11 is illustrated with a solid line. The internal electrode 12a connected to the external electrode 20 is illustrated with a thick broken line. The internal electrode 12b connected to the external electrode 30 is illustrated with a thin broken line. As illustrated in FIG. 12, in the third embodiment, in the X-direction, the edge position of the internal electrode 12a is different from the edge position of the internal electrode 12b. In this case, the stress caused by the electrostrictive effect is dispersed. However, as indicated with a region illustrated by a thick dotted line, a side of the internal electrode 12a extending in the Y-direction crosses a side of the internal electrode 12b extending in the X-direction, at right angles. In this manner, the stress is condensed in the region in which sides cross at right angles.

Figure 13:
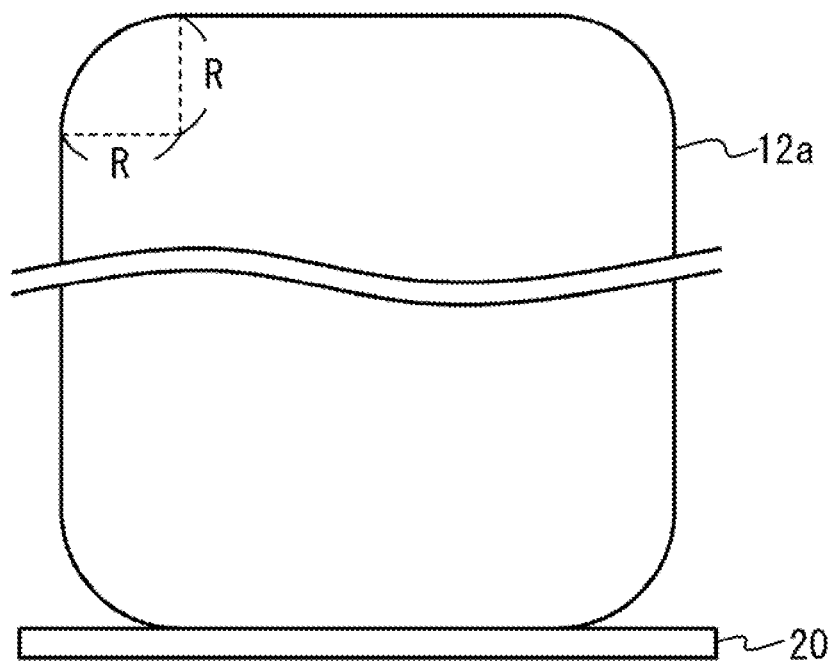
FIG. 13 illustrates a plan view of an internal electrode of a first embodiment.

FIG. 13 illustrates a plan view of the internal electrode 12a of the embodiment. As illustrated in FIG. 13, each corner of the internal electrode 12a that is not connected to the external electrode 20 has a rounded shape. FIG. 13 illustrates the internal electrode 12a. In addition, the internal electrode 12b as the same plan shape. That is, the each corner of the internal electrode 12b that is not connected to the external electrode 30 has a rounded shape. A curvature radius of each corner is expressed by "R". Each corner connected to the external electrode 20 or the external electrode 30 may have a rounded shape or have a right-angled shape.

Figure 14A:
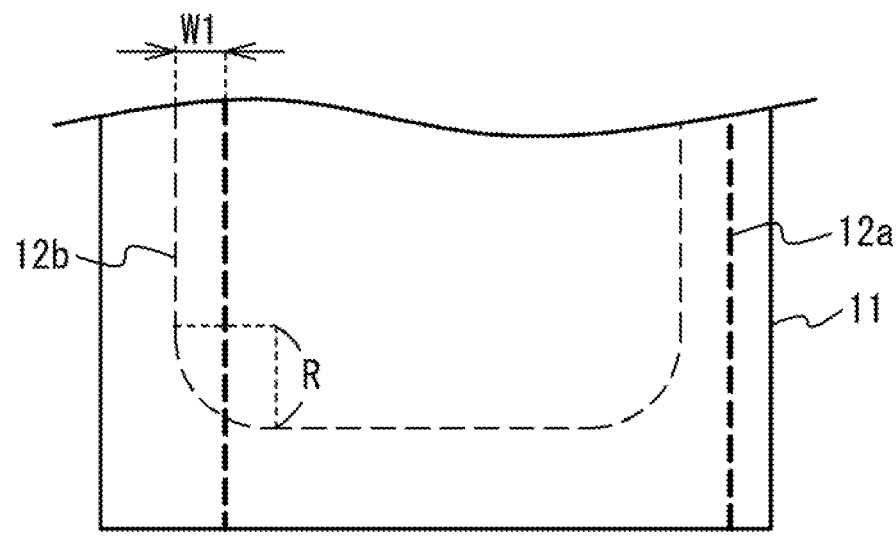
FIG. 14A and FIG. 14B illustrate overlapping of internal electrodes.
Figure 14B:
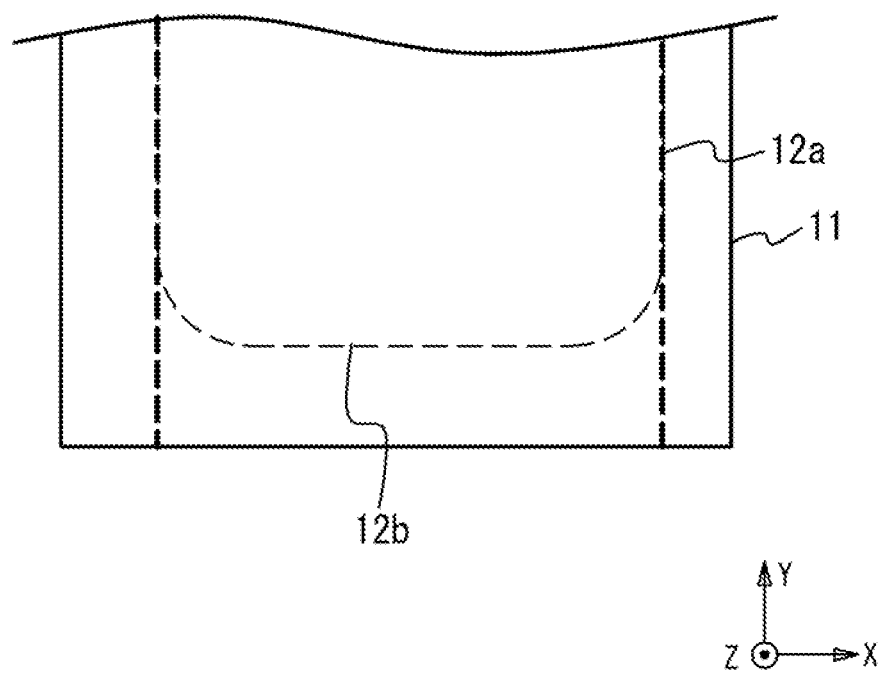

As illustrated in FIG. 14A, the curvature radius R is larger than "W1". Thus, with respect to the internal electrode 12a and the internal electrode 12b of which edge positions are different from each other in the X-direction, a side extending in the Y-direction does not cross another side extending in the X-direction but cross diagonally. Thus, the stress is dispersed. In FIG. 14B, with respect to the internal electrode 12a and the internal electrode 12b of which edge positions overlap with each other in the X-direction, a side extending in the Y-direction does no cross another side extending in the X-direction at right angles.

Figure 15:
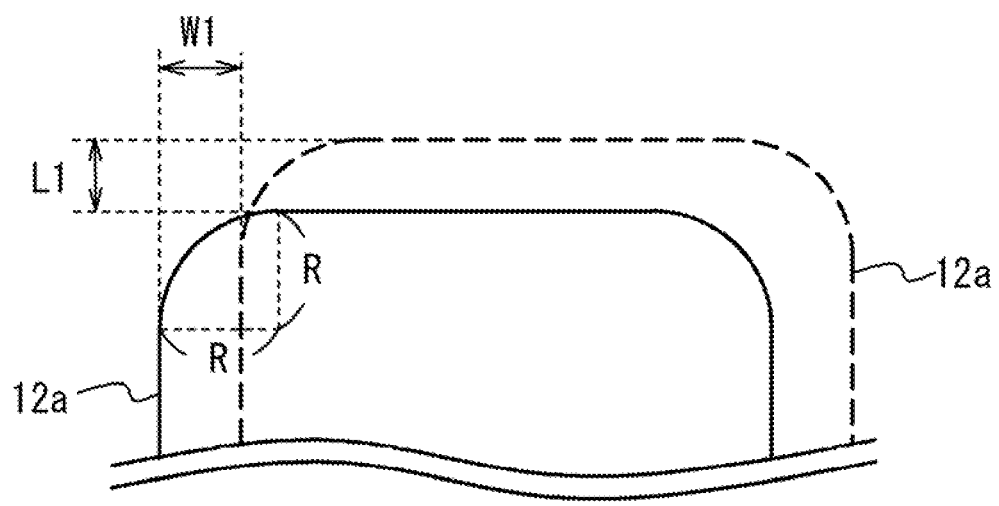
FIG. 15 illustrates overlapping of internal electrodes.

As illustrated in FIG. 15, the curvature radius R is larger than W1. Therefore, with respect to two internal electrodes 12a, a side extending in the Y-direction does not cross another side extending in the X-direction at right angles but cross diagonally. With respect to two internal electrodes 12b, a side extending in the Y-direction does not cross another side extending in the X-direction at right angles but cross diagonally. Therefore, the stress is dispersed. Moreover, it is preferable that the curvature radius R is larger than "L1". In this case, with respect to two internal electrodes 12a, an intersection angle between a side extending in the Y-direction and another side extending in the X-direction becomes smaller. And, with respect to two internal electrodes 12b, an intersection angle between a side extending in the Y-direction and another side extending in the X-direction becomes smaller. Therefore, the stress is more dispersed.

In the embodiment, one pair of the external electrodes 20 and 30 are respectively provided on the edge faces of the multilayer structure 10 facing each other. Each of the plurality of internal electrodes 12 is connected to one of the external electrodes 20 and 30. In the multilayer ceramic capacitor, $t1^2 \times L1/N$ is equal to or more than a predetermined value. "L1" (mm) is a distance between a first edge Y1 that is the outermost of the edges of the plurality of internal electrodes 12 that are not connected to any of the external electrode 20 and 30 in the Y-direction (facing direction of the external electrodes 20 and 30) and a second edge Y2 that is the innermost of the edges of the plurality of internal electrodes 12. "t1" (μm) is a layer thickness of each dielectric layer 11. "N" is a stack number of the plurality of dielectric layers 11.

Thus, the stress caused by the electrostrictive effect is dispersed and the withstand voltage can be improved. It is preferable that $t1^2 \times L1/N$ is equal to or more than 1. It is more preferable that $t1^2 \times W1/N$ is equal to or more than 10.

It is still more preferable that $t1^2 \times W1/N$ is equal to or more than 20. When $t1^2 \times L1/N$ is large, the width of the multilayer structure 10 becomes larger in the Y-direction. Therefore, it is preferable that $t1^2 \times L1/N$ is equal to or less than 100.

When the electrostrictive effect of the dielectric layer 11 is large, the stress becomes larger and the withstand voltage becomes smaller. It is therefore preferable that the deviation amount "L1" is large. A sintered material of which main component is barium titanate is used as a material having large electrostrictive effect.

It is preferable that the positions of the edges of the plurality of internal electrodes 12 in the Y-direction that are not connected to the external electrodes 20 and 30 are periodically arranged. In this case, tension can be evenly dispersed. It is therefore possible to disperse the stress. And it is possible to improve the withstand voltage.

Each group has a plurality of internal electrodes 12a that have the same edge position in the Y-direction and are adjacent to each other and a plurality of internal electrodes 12b that have the same edge position in the Y-direction and are adjunct to each other. In this case, it is preferable that the edge position of group is different from each other. Thus, the tension can be evenly dispersed. It is therefore possible to evenly disperse the stress. And the withstand voltage can be improved.

The large multilayer ceramic capacitor of which operation voltage is high has a large stress caused by the electrostrictive effect. It is therefore preferable that the deviation amount "L1" is enlarged in the multilayer ceramic capacitor of which operation voltage is equal to or more than 100V or 200V. And, it is preferable that the deviation amount "L1" is enlarged in the multilayer ceramic capacitor of which length "L" and width "W" are equal to 10 mm or more.

$t1^2 \times W1/N$ is equal to or more than a predetermined value. "W1" (mm) is a distance between the first edge that is the outermost of the edges of the plurality of internal electrodes 12 in the X-direction (a second direction intersecting with the first direction (the Y-direction) in a face direction of the internal electrode 12 and the dielectric layer 11) and the second edge that is the innermost of the edges of the plurality of internal electrodes 12 in the X direction. "t1" (μm) is a layer thickness of each dielectric layer 11. "N" is a stack number of the plurality of dielectric layers 11.

Thus, the stress caused by the electrostrictive effect is dispersed and the withstand voltage can be improved. It is preferable that $t1^2 \times W1/N$ is equal to or more than 1. It is more preferable that $t1^2 \times W1/N$ is equal to or more than 10. It is still more preferable that $t1^2 \times W1/N$ is equal to or more than 20. When $t1^2 \times W1/N$ is large, the width of the multilayer structure 10 becomes larger in the X-direction. Therefore, it is preferable that $t1^2 \times W1/N$ is equal to or less than 100.

When the electrostrictive effect of the dielectric layer 11 is large, the stress becomes larger and the withstand voltage becomes smaller. It is therefore preferable that the deviation amount "W1" is large.

It is preferable that the positions of the edges of the plurality of internal electrodes 12 in the X-direction are periodically arranged. In this case, tension can be evenly dispersed. It is therefore possible to disperse the stress. And it is possible to improve the withstand voltage.

Each group has a plurality of internal electrodes 12 that have the same edge position in the X-direction and are adjacent to each other. In this case, it is preferable that the edge position of group is different from each other. Thus, the tension can be evenly dispersed. It is therefore possible to evenly disperse the stress. And the withstand voltage can be improved.

The large multilayer ceramic capacitor 100 of which operation voltage is high has a large stress caused by the electrostrictive effect. It is therefore preferable that the deviation amount "W1" is enlarged in the multilayer ceramic capacitor of which operation voltage is equal to or more than 100V or 200V. And, it is preferable that the deviation amount "W1" is enlarged in the multilayer ceramic capacitor of which length "L" and width "W" are equal to 10 mm or more.

Moreover, each corner of the internal electrodes 12 that is not connected to the external electrode 20 and 30 has a rounded shape. The curvature radius of the corner is larger than "W1". Thus, with respect to two internal electrodes 12 of which edge positions are different from each other in the X-direction, a side extending in the Y-direction does not cross another side extending in the X-direction but cross diagonally. It is therefore possible to scatter the stress caused by the electrostrictive effect.

Second Embodiment

Figure 16A:
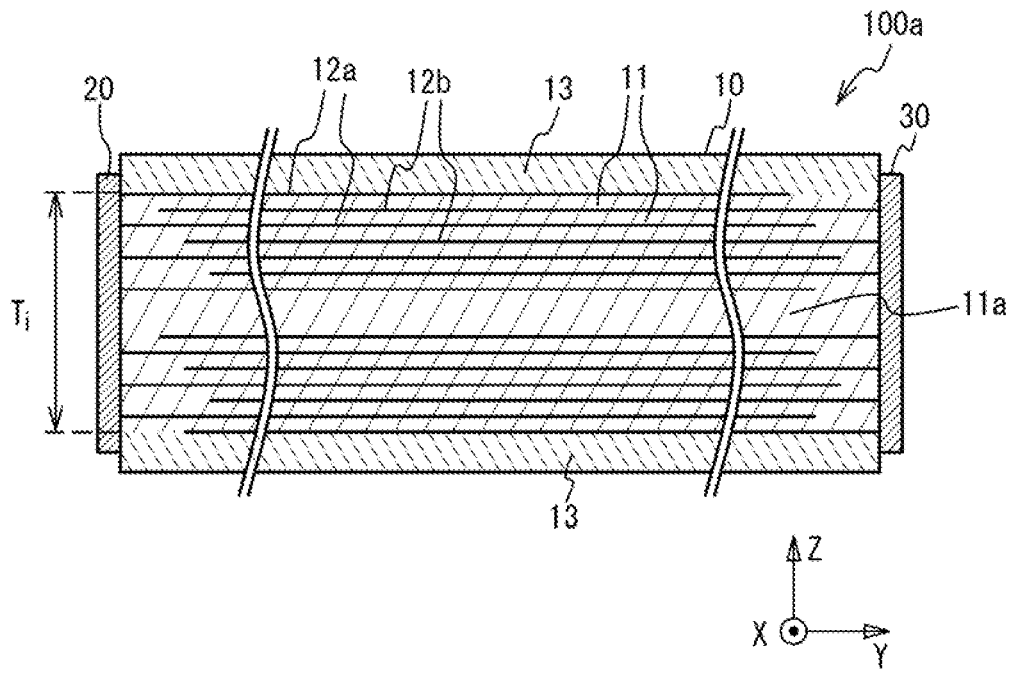
FIG. 16A and FIG. 16B illustrate a multilayer structure of a multilayer ceramic capacitor in accordance with a second embodiment.

FIG. 16A illustrates a multilayer structure of a multilayer ceramic capacitor 100a in accordance with a second embodiment. As illustrated in FIG. 16A, the multilayer ceramic capacitor 100a is different from the multilayer ceramic capacitor 100 in a point that a thick-film dielectric layer 11a having three times or more than the dielectric layer 11 in anyone of positions of the multilayer structure 10 in the stack direction.

The thickness of the thick-film dielectric layer 11a is larger than that of the dielectric layers 11. Therefore strength against the stress of the dielectric layer 11a is larger than that of the dielectric layers 11. Thus, the stress in the multilayer structure 10 caused by the electrostrictive effect can be dispersed. It is therefore possible to improve the withstand voltage.

Figure 16B:
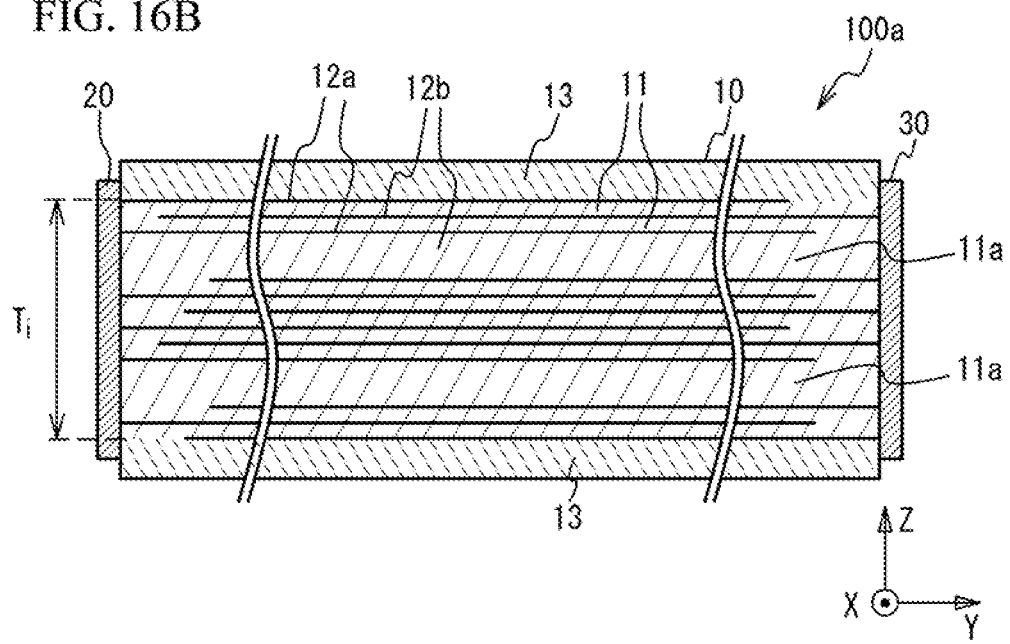

It is preferable that the thickness of the thick-film dielectric layer 11a is three times or more than the thickness of the dielectric layers 11. When a position of an upper face of the cover layer 13 that is lower one of the multilayer structure 10 in the Z-direction is zero and a position of a lower face of the cover layer 13 that is upper one of the multilayer structure in the Z-direction is Ti, it is preferable that the thick-film dielectric layer 11a is located at Ti/3 or more and 2Ti/3 or less in the stack direction of the multilayer structure 10. As illustrated in FIG. 16B, two or more thick-film dielectric layers 11a may be provided and may be spaced from each other.

Examples

The multilayer ceramic capacitors in accordance with the embodiments were manufactured. The main component of the internal electrode 12 and the external electrodes 20 and 30 was nickel. The main component of the dielectric layer 11 was barium titanate. Examples 1 to 4 and comparative examples 1 to 3 were manufactured. The withstand voltage BDV of the manufactured samples was measured. In the measurement of the BDV, a direct current is applied between the external electrode 20 and the external electrode 30. An increasing speed of the voltage was 50 sec/1 kV. The voltage at which the sample was broken was the withstand voltage BDV.

FIG. 17 illustrates each size of samples of the examples 1 to 4 and the comparative examples 1 to 3. As illustrated in FIG. 17, the length L of the multilayer structure 10 was 14 mm. The width of the multilayer structure 10 was 19 mm. In the example 1 and the comparative example 1, the thickness T of the multilayer structure 10 was 3.3 mm. In the examples 2 to 4 and the comparative examples 2 and 3, the thickness T of the multilayer structure 10 was 4.1 mm. The width Wi of the internal electrode 12 was 15 mm in any of the examples 1 to 4 and the comparative examples 1 to 3. All of the internal electrodes 12 had the same width. In the examples 1 to 4, the deviation amount W1 was 1.2 mm. In the comparative examples 1 to 3, the deviation amount W1 was 0.019 mm. In the examples 1 to 4, the side margin SM was 0.8 mm. In the comparative examples 1 to 3, the side margin SM was 2 mm. The overlapping width L1 of the internal electrodes 12a and 12b was 11 mm in any of the examples 1 to 4 and the comparative examples 1 to 3. In the examples 1 to 4, the deviation amount L1 was 1.3 mm. In the comparative examples 1 to 3, the deviation amount L1 was 0.019 mm. In the examples 1 to 4, the end margin EM was 0.85 mm. In the comparative examples 1 to 3, the end margin EM was 1.5 mm. In the examples 1 to 4, the curvature radius was 2.5 mm. In the comparative examples 1 to 3, the curvature radius was 0.003 mm. In the examples 1 and 4 and the comparative example 1, the thickness t1 of the dielectric layers 11 was 26.1 µm. In the examples 2 and 3 and the comparative example 2, the thickness t1 of the dielectric layers 11 was 35.6 µm. In the comparative example 3, the thickness t1 of the dielectric layers 11 was 27.3 µm. In the examples 1, 3 and 4 and the comparative examples 1 and 3, the stack number N was 68. In the example 2 and the comparative example 2, the stack number was 81. In the examples 1 to 3 and the comparative examples 1 to 3, the thick-film dielectric layer 11a was not provided. In the example 4, one thick-film dielectric layer 11a having a thickness "ta" of 78.3 µm that was three times as that of the dielectric layer 11 was provided in a center of the stack direction.

In the comparative examples 1 to 3, the withstand voltages BDV were low values of 535V, 549V and 538V. It is thought that this was because $[(t1)^2 \times L1]/N$ and $[(t1)^2 \times W1]/N$ were less than 1 and the stress caused by the electrostrictive effect was not dispersed. And, it is thought that this was because the curvature radius R was not larger than W1, a side of the internal electrode 12a extending in the Y-direction crossed a side of the internal electrode 12b extending in the X-direction at right angles, and the stress was condensed in the region in which the sides crossed at right angles.

Compared to the comparative examples 1 to 3, in the examples 1 to 3, the withstand voltages BDV were sufficiently high values of 1483V, 1497V and 1550V. It is thought that this was because $[(t1)^2 \times L1]/N$ and $[(t1)^2 \times W1]/N$ were 10 or more, the curvature radius R was larger than W1, a side of the internal electrode 12a extending in the Y-direction diagonally crosses a side of the internal electrode 12b extending in the X-direction, and the stress caused by the electrostrictive effect was sufficiently dispersed. And, it is thought that this was because, with respect to two internal electrodes 12a or two internal electrodes 12b, the curvature radius R was larger than L1, a side extending in the Y-direction diagonally crosses another side extending in the X-direction, and the stress was more dispersed.

Moreover, in the example 4, the thickness "t1" of the dielectric layer 11 was the same as that of the example 1. However, the withstand voltage of the example 4 was 1549V that was higher than that of the example 1. It is thought that this was because the thick-film dielectric layer 11a was provided, and the stress was more dispersed.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
  a multilayer structure in which each of a plurality of dielectric layers and each of a plurality of internal electrode layers are alternately stacked, a main component of the plurality of dielectric layers being ceramic, the multilayer structure having a rectangular parallelepiped shape, the plurality of internal electrode layers being alternately exposed to a first edge face and a second edge face of the multilayer structure, the first edge face facing with the second edge face; and
  a pair of external electrodes that are respectively provided on the first edge face and the second edge face,
  wherein $t1^2 \times L1/N$ is equal to or more than 10, when a distance between a first edge that is an outermost edge of edges of the plurality of internal electrodes that is not connected to the first external electrode or the second external electrode in a first direction along a facing direction of the pair of external electrodes and a second edge that is an innermost edge of edges of the plurality of internal electrodes that is not connected to the first external electrode or the second external electrode in the first direction is L1 (mm), each thickness of the plurality of dielectric layers is t1 (µm), and a stack number of the plurality of dielectric layers is N,
  wherein $t1^2 \times W1/N$ is equal to or more than 10, when a distance between a first edge that is positioned at outermost of the plurality of internal electrodes in a second direction intersecting with the first direction in a plane direction of the plurality of internal electrodes and the plurality of dielectric layers and a second edge that is positioned at innermost of the plurality of internal electrodes in the second direction is W1 (mm), and
  wherein R is larger than W1, when a curvature radius of a corner of an edge of the plurality of internal electrodes that is not connected to the first external electrode or the second external electrode is R (mm).

2. The multilayer ceramic capacitor as claimed in claim 1, wherein R is larger than L1.

3. The multilayer ceramic capacitor as claimed in claim 1, further comprising a thick-film dielectric layer in anyone of positions of a stack direction,
  wherein a thickness of the thick-film dielectric layer is three times or more than that of the plurality of ceramic dielectric layer.

4. The multilayer ceramic capacitor as claimed in claim 1, wherein the main component of the plurality of dielectric layers is barium titanate.

5. The multilayer ceramic capacitor as claimed in claim 1, wherein the edges of the plurality of internal electrodes in the first direction are periodically positioned in a stack direction of the multilayer structure.

6. The multilayer ceramic capacitor as claimed in claim 5, wherein:
  each group has a plurality of internal electrodes that are connected to the first external electrode, have the same edge position and are adjacent to each other and a plurality of internal electrodes that are connected to the second external electrode, have the same edge position and are adjacent to each other; and the edge position of each group is different from each other.

7. The multilayer ceramic capacitor as claimed in claim 1, wherein the edges of the plurality of internal electrodes in the second direction are periodically positioned in a stack direction of the multilayer structure.

8. The multilayer ceramic capacitor as claimed in claim 7, wherein:

each group has a plurality of internal electrodes that have the same edge position and are adjacent to each other; and the edge position of each group is different from each other.

* * * * *